United States Patent
Shang et al.

(10) Patent No.: US 11,650,911 B2
(45) Date of Patent: May 16, 2023

(54) SUPPORTING RECORD AND REPLAY FOR INFINITE SCROLL ELEMENTS

(71) Applicant: MICRO FOCUS LLC, Santa Clara, CA (US)

(72) Inventors: Er-Xin Shang, Shanghai (CN); Yun-Sheng Liu, Shanghai (CN); Shuhui Fu, Shanghai (CN); Yi-Bin Guo, Shanghai (CN); Yun Yuan, Shanghai (CN); Hua-Ming Zhai, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 77 days.

(21) Appl. No.: 17/341,933

(22) Filed: Jun. 8, 2021

(65) Prior Publication Data
US 2022/0391313 A1    Dec. 8, 2022

(51) Int. Cl.
*G06F 11/36* (2006.01)

(52) U.S. Cl.
CPC ...... *G06F 11/3688* (2013.01); *G06F 11/3664* (2013.01); *G06F 11/3692* (2013.01)

(58) Field of Classification Search
CPC .................. G06F 11/36–3696; G06F 9/451
See application file for complete search history.

(56) References Cited

U.S. PATENT DOCUMENTS

| | | | | |
|---|---|---|---|---|
| 5,600,789 A | * | 2/1997 | Parker | G06K 13/0825 714/38.11 |
| 10,585,576 B2 | * | 3/2020 | Yin | G06F 3/04855 |
| 2017/0308246 A1 | * | 10/2017 | DeLuca | G06F 3/0485 |

* cited by examiner

*Primary Examiner* — Todd Aguilera
(74) *Attorney, Agent, or Firm* — Sheridan Ross P.C.

(57) ABSTRACT

Embodiments provide for automated testing of an Application Under Test (AUT) that utilizes an infinite scroll element. Automated testing of the AUT can comprise executing one or more test scripts on the AUT which can present a user interface including a plurality of elements and the test scripts can perform one or more functional tests on the AUT through the plurality of elements of the user interface. During performance of the one or more functional tests, a scroll event associated with an element of the user interface can be detected and a determination can be made as to whether the element associated with the scroll event is an infinite scroll element. In response to determining the element is an infinite scroll element, a set of test results for the functional test can be recorded including results for the infinite scroll element and an interaction with the infinite scroll element.

20 Claims, 7 Drawing Sheets

SUPPORTING RECORD AND REPLAY FOR INFINITE SCROLL ELEMENTS

FIELD OF THE DISCLOSURE

Embodiments of the present disclosure relate generally to methods and systems for automated testing of an application and more particularly to automated testing of an application that utilizes an infinite scroll element.

BACKGROUND

How to proper display a large amount of content on a web page is always a challenging problem for web developers. There are two approaches to this problem in web development. One is the traditional pagination in which the data is separated and displayed in different web pages. An example of this is how search results are presented by well-known and popular search engines in which a certain number of results are presented on one page with additional results presented on subsequent pages available to the user through a link, button, or other element. Another approach is to use an infinite scroll element. An infinite scroll element, such as used in well-known websites such as YouTube, Facebook, Instagram, Twitter, and others, can present any number of objects such as photographs, videos thumbnails, textual and/or graphical posts, links, etc. Rather than splitting these objects between multiple pages, the objects are presented in a manner such that when a user utilizes a scroll bar of the infinite scroll element, presented objects scroll out of view while new, additional objects scroll into view in a continuous and seemingly infinite manner as the user continues to scroll.

Infinite scroll is intuitive for viewers and is mobile friendly when viewed on devices having relatively small screens. However, for testing purposes, it is not easy to create an automatic test script for such elements. The reason is that there is no common click action from the user to trigger the loading process. After the user interacts with an object inside of the scroll list, available automated testing tools cannot directly find the element when the navigation is finished. Currently, there are no approaches to support automatic record and replay of infinite scroll elements in automated testing tools. Hence, there is a need for improved methods and systems for automated testing of an application that utilizes an infinite scroll element.

BRIEF SUMMARY

Embodiments of the disclosure provide systems and methods for automated testing of an application that utilizes an infinite scroll element. According to one embodiment, a method for automated testing of an application that utilizes an infinite scroll element can comprise executing, by a processor of a testing system, one or more test scripts on an Application Under Test (AUT). The AUT can present a user interface including a plurality of elements and the one or more test scripts can cause the processor to perform one or more functional tests on the AUT through the plurality of elements of the user interface. During performance of the one or more functional tests, a scroll event associated with an element of the plurality of elements of the user interface can be detected and a determination can be made as to whether the element associated with the scroll event is an infinite scroll element. In response to determining the element associated with the scroll event is an infinite scroll element, a set of test results for the one or more functional tests can be recorded. The set of test results can include results for the infinite scroll element and an interaction with the infinite scroll element.

Determining whether the element associated with the scroll event is an infinite scroll element can comprise determining a scrolled amount for the element associated with the scroll event and a window containing the element associated with the scroll event. The determined scrolled amount for the element associated with the scroll event and a window containing the element associated with the scroll event can be compared to a height and width for the element associated with the scroll event and the window containing the element associated with the scroll event. A determination can be made as to whether the element associated with the scroll event is continuing to be scrolled based on comparing the determined scrolled amount for the element associated with the scroll event and the window containing the element associated with the scroll event to the height and width for the element associated with the scroll event and the window containing the element associated with the scroll event. In response to determining the element corresponding the scroll event is continuing to be scrolled, a node child property of the element associated with the scroll event can be monitored and a determination can be made, based on monitoring the node child property of the element associated with the scroll event, as to whether a number of child nodes of the element associated with the scroll event has increased. In response to determining the number of child nodes of the element associated with the scroll event has increased, the element associated with the scroll event can be identified as an infinite scroll element.

Recording the set of test result including results for the infinite scroll element and an interaction with the infinite scroll element can comprise detecting the interaction with the infinite scroll element and determining whether the infinite scroll element is a child element of a previously recorded infinite scroll element. In response to determining the infinite scroll element is a child element of a previously recorded infinite scroll element, generating a corresponding infinite scroll element in the set of test results, recording a total number of times the infinite scroll element has been scrolled for the corresponding infinite scroll element in the set of test results, and adding the total number of times the infinite scroll element has been scrolled to a scroll parameter for the corresponding infinite scroll element in the set of testing results. Additionally, or alternatively, the recorded results for the infinite scroll element and the interaction with the infinite scroll element can comprise a scroll target for the infinite scroll element, an action object for the infinite scroll element, and/or a maximum scroll amount for the infinite scroll element.

The results for the infinite scroll element and an interaction with the infinite scroll element can be replayed. Replaying the results for the infinite scroll element and the interaction with the infinite scroll element can comprise rendering the infinite scroll element based on the results for the infinite scroll element recorded in the test results, locating the scroll target for the rendered infinite scroll element based on the interaction with the infinite scroll element recorded in the test results, simulating, on the rendered infinite scroll element, the recorded interaction with the infinite scroll element based on the located target, monitoring, while simulating the recorded interaction with the infinite scroll element, for one or more child nodes of the infinite scroll element, and determining, based on monitoring for the one or more child nodes of the infinite scroll element, whether the action object for the infinite scroll element has been located. In response to determining the action object of the infinite scroll element has been located, the recorded action can be performed on the action object. In response to determining the action object of the infinite scroll element has not been located, a determination can be made based on simulating the recorded interaction with the infinite scroll element as to whether the maximum scroll amount for the infinite scroll element has been reached. In response to determining the maximum scroll amount for the infinite scroll element has not been reached, simulating the recorded interaction with the infinite scroll element, monitoring for one or more child nodes of the infinite scroll element, and determining whether the action object of the infinite scroll element is located can continue until determining that the action object for the infinite scroll element has been located or determining the maximum scroll amount for the infinite scroll element is reached.

According to another embodiment, a system can comprise a processor and a memory coupled with and readable by the processor. The memory can store therein a set of instructions which, when executed by the processor, causes the processor to perform automated testing on an application that utilizes an infinite scroll element by executing one or more test scripts on an AUT. The AUT can present a user interface including a plurality of elements and the one or more test scripts can cause the processor to perform one or more functional tests on the AUT through the plurality of elements of the user interface. During performance of the one or more functional tests, the instructions can cause the processor to detect a scroll event associated with an element of the plurality of elements of the user interface and determine whether the element associated with the scroll event is an infinite scroll element. In response to determining the element associated with the scroll event is an infinite scroll element, the instructions can cause the processor to record a set of test results for the one or more functional tests, the set of test results including results for the infinite scroll element and an interaction with the infinite scroll element.

Determining whether the element associated with the scroll event is an infinite scroll element can comprise determining a scrolled amount for the element associated with the scroll event and a window containing the element associated with the scroll event. The determined scrolled amount for the element associated with the scroll event and a window containing the element associated with the scroll event can be compared to a height and width for the element associated with the scroll event and the window containing the element associated with the scroll event. A determination can be made as to whether the element associated with the scroll event is continuing to be scrolled based on comparing the determined scrolled amount for the element associated with the scroll event and the window containing the element associated with the scroll event to the height and width for the element associated with the scroll event and the window containing the element associated with the scroll event. In response to determining the element corresponding the scroll event is continuing to be scrolled, a node child property of the element associated with the scroll event can be monitored and a determination can be made, based on monitoring the node child property of the element associated with the scroll event, as to whether a number of child nodes of the element associated with the scroll event has increased. In response to determining the number of child nodes of the element associated with the scroll event has increased, the element associated with the scroll event can be identified as an infinite scroll element.

Recording the set of test result including results for the infinite scroll element and an interaction with the infinite scroll element can comprise detecting the interaction with the infinite scroll element and determining whether the infinite scroll element is a child element of a previously recorded infinite scroll element. In response to determining the infinite scroll element is a child element of a previously recorded infinite scroll element, generating a corresponding infinite scroll element in the set of test results, recording a total number of times the infinite scroll element has been scrolled for the corresponding infinite scroll element in the set of test results, and adding the total number of times the infinite scroll element has been scrolled to a scroll parameter for the corresponding infinite scroll element in the set of testing results. Additionally, or alternatively, the recorded results for the infinite scroll element and the interaction with the infinite scroll element can comprise a scroll target for the infinite scroll element, an action object for the infinite scroll element, and/or a maximum scroll amount for the infinite scroll element.

The instructions can further cause the processor to replay the results for the infinite scroll element and an interaction with the infinite scroll element. Replaying the results for the infinite scroll element and the interaction with the infinite scroll element can comprise rendering the infinite scroll element based on the results for the infinite scroll element recorded in the test results, locating the scroll target for the rendered infinite scroll element based on the interaction with the infinite scroll element recorded in the test results, simulating, on the rendered infinite scroll element, the recorded interaction with the infinite scroll element based on the located target, monitoring, while simulating the recorded interaction with the infinite scroll element, for one or more child nodes of the infinite scroll element, and determining, based on monitoring for the one or more child nodes of the infinite scroll element, whether the action object for the infinite scroll element has been located. In response to determining the action object of the infinite scroll element has been located, the recorded action can be performed on the action object. In response to determining the action object of the infinite scroll element has not been located, a determination can be made based on simulating the recorded interaction with the infinite scroll element as to whether the maximum scroll amount for the infinite scroll element has been reached. In response to determining the maximum scroll amount for the infinite scroll element has not been reached, simulating the recorded interaction with the infinite scroll element, monitoring for one or more child nodes of the infinite scroll element, and determining whether the action object of the infinite scroll element is located can continue until determining that the action object for the infinite scroll element has been located or determining the maximum scroll amount for the infinite scroll element is reached.

According to yet another embodiment, a non-transitory, computer-readable medium can comprise a set of instructions stored therein which, when executed by a processor, causes the processor to perform automated testing on an application that utilizes an infinite scroll element by executing one or more test scripts on an AUT. The AUT can present a user interface including a plurality of elements and the one or more test scripts can cause the processor to perform one or more functional tests on the AUT through the plurality of elements of the user interface. During performance of the one or more functional tests, the instructions can cause the processor to detect a scroll event associated with an element of the plurality of elements of the user interface and determine whether the element associated with the scroll event is an infinite scroll element. In response to determining the element associated with the scroll event is an infinite scroll element, the instructions can cause the processor to record a set of test results for the one or more functional tests, the set of test results including results for the infinite scroll element and an interaction with the infinite scroll element.

Determining whether the element associated with the scroll event is an infinite scroll element can comprise determining a scrolled amount for the element associated with the scroll event and a window containing the element associated with the scroll event. The determined scrolled amount for the element associated with the scroll event and a window containing the element associated with the scroll event can be compared to a height and width for the element associated with the scroll event and the window containing the element associated with the scroll event. A determination can be made as to whether the element associated with the scroll event is continuing to be scrolled based on comparing the determined scrolled amount for the element associated with the scroll event and the window containing the element associated with the scroll event to the height and width for the element associated with the scroll event and the window containing the element associated with the scroll event. In response to determining the element corresponding the scroll event is continuing to be scrolled, a node child property of the element associated with the scroll event can be monitored and a determination can be made, based on monitoring the node child property of the element associated with the scroll event, as to whether a number of child nodes of the element associated with the scroll event has increased. In response to determining the number of child nodes of the element associated with the scroll event has increased, the element associated with the scroll event can be identified as an infinite scroll element.

Recording the set of test result including results for the infinite scroll element and an interaction with the infinite scroll element can comprise detecting the interaction with the infinite scroll element and determining whether the infinite scroll element is a child element of a previously recorded infinite scroll element. In response to determining the infinite scroll element is a child element of a previously recorded infinite scroll element, generating a corresponding infinite scroll element in the set of test results, recording a total number of times the infinite scroll element has been scrolled for the corresponding infinite scroll element in the set of test results, and adding the total number of times the infinite scroll element has been scrolled to a scroll parameter for the corresponding infinite scroll element in the set of testing results. Additionally, or alternatively, the recorded results for the infinite scroll element and the interaction with the infinite scroll element can comprise a scroll target for the infinite scroll element, an action object for the infinite scroll element, and/or a maximum scroll amount for the infinite scroll element.

The instructions can further cause the processor to replay the results for the infinite scroll element and an interaction with the infinite scroll element. Replaying the results for the infinite scroll element and the interaction with the infinite scroll element can comprise rendering the infinite scroll element based on the results for the infinite scroll element recorded in the test results, locating the scroll target for the rendered infinite scroll element based on the interaction with the infinite scroll element recorded in the test results, simulating, on the rendered infinite scroll element, the recorded interaction with the infinite scroll element based on the located target, monitoring, while simulating the recorded interaction with the infinite scroll element, for one or more child nodes of the infinite scroll element, and determining, based on monitoring for the one or more child nodes of the infinite scroll element, whether the action object for the infinite scroll element has been located. In response to determining the action object of the infinite scroll element has been located, the recorded action can be performed on the action object. In response to determining the action object of the infinite scroll element has not been located, a determination can be made based on simulating the recorded interaction with the infinite scroll element as to whether the maximum scroll amount for the infinite scroll element has been reached. In response to determining the maximum scroll amount for the infinite scroll element has not been reached, simulating the recorded interaction with the infinite scroll element, monitoring for one or more child nodes of the infinite scroll element, and determining whether the action object of the infinite scroll element is located can continue until determining that the action object for the infinite scroll element has been located or determining the maximum scroll amount for the infinite scroll element is reached.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
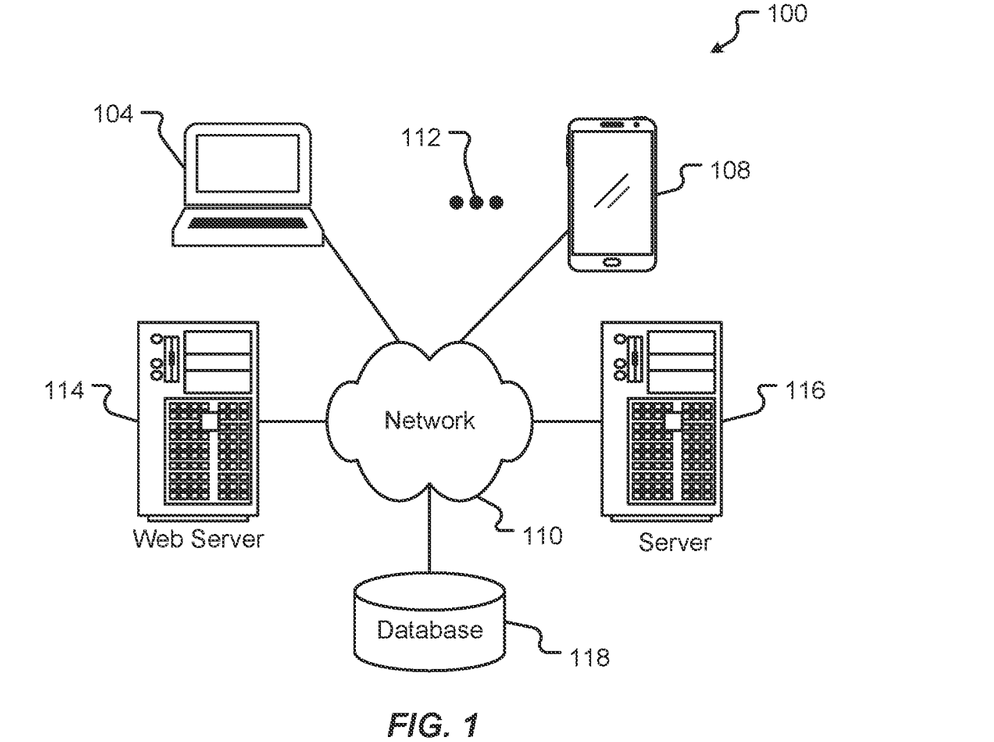
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
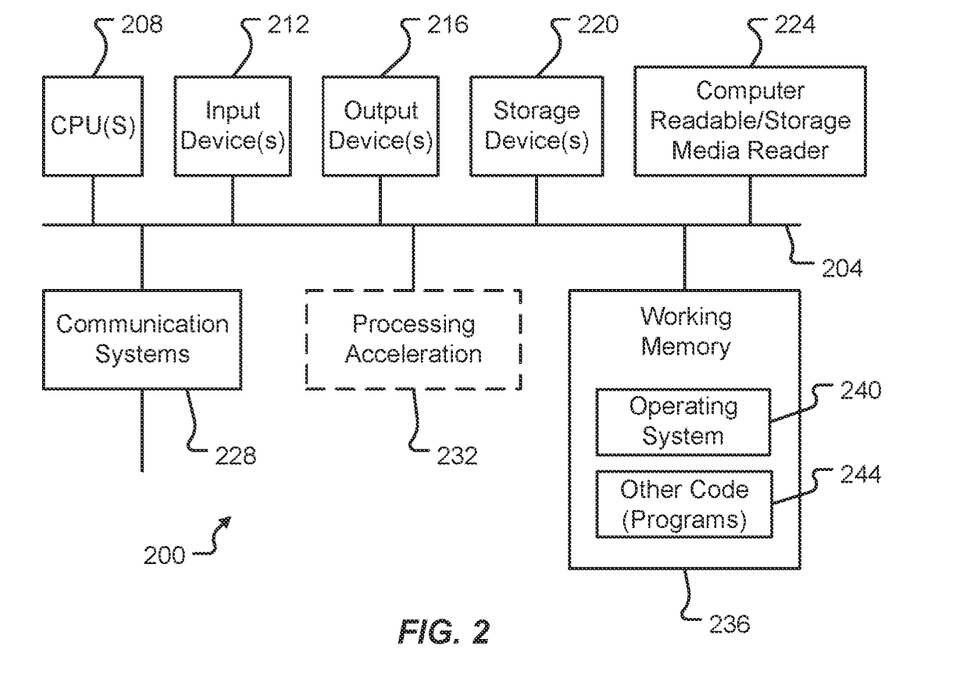
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
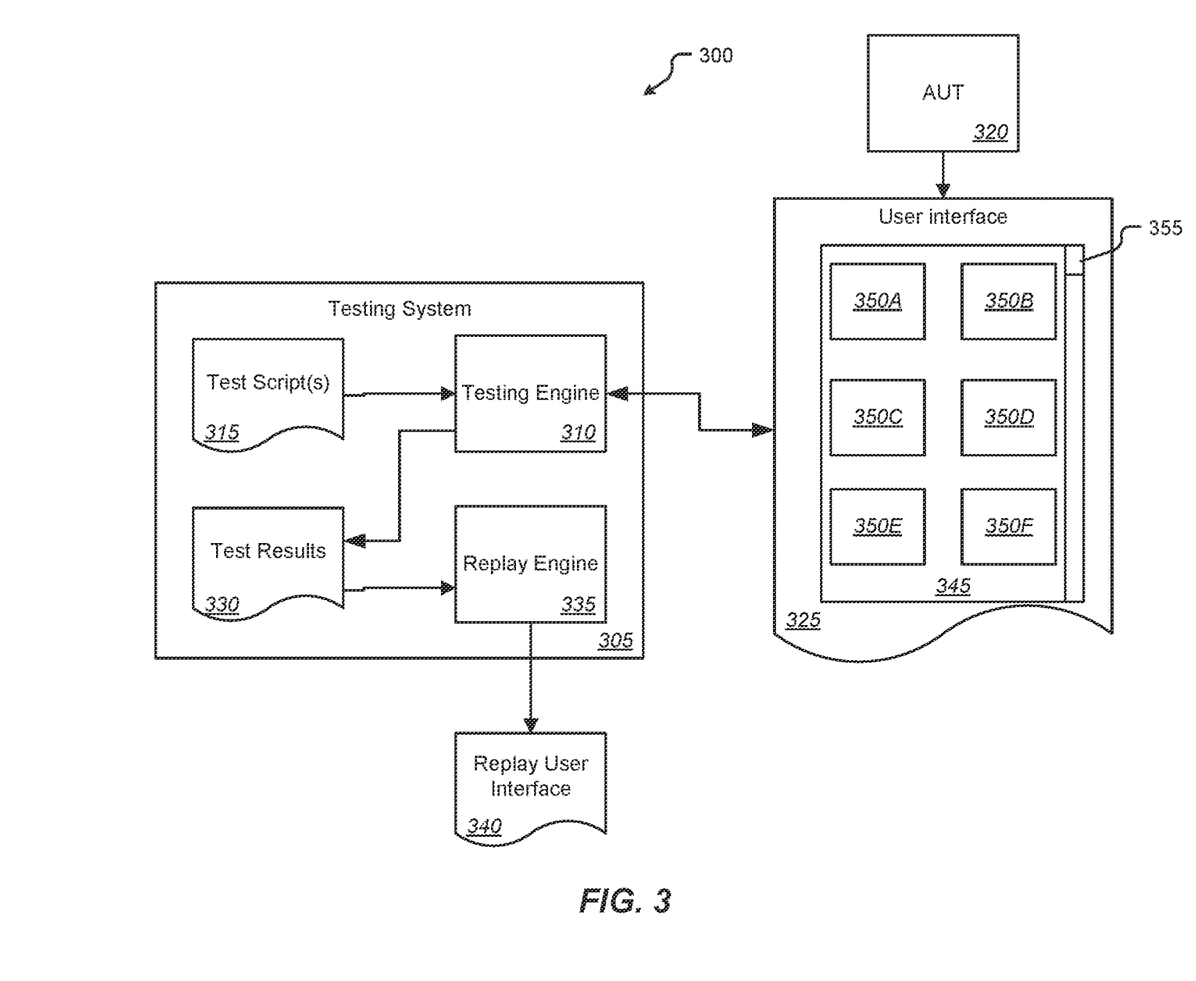
FIG. 3 is a block diagram illustrating exemplary components of a testing environment according to one embodiment of the present disclosure.

FIG. 3 is a block diagram illustrating exemplary components of a testing environment according to one embodiment of the present disclosure. As illustrated in this example, the testing environment 300 can include a testing system 305 which can be implemented and executed on any one or more servers and/or other computing devices as described above. The testing system 305 can execute a testing engine 310. Generally speaking, the test engine 310 can execute one or more test scripts 315 to perform functional testing on an Application Under Test (AUT) 320. The test functions defined in the test scripts 315 can operate based on a user interface 325 of the AUT 320 and objects, e.g., links, buttons, icons, and/or other elements, within the user interface 325. For example, and as known in the art, this can include navigating the user interface 325 of the AUT 320, manipulating the elements therein, etc. Results of executing these tests, e.g., the navigation through the user interface 325 of the AUT 320, selection of various elements, resulting changes in the user interface 325, etc., can be recorded by the testing engine 310 in a set of test results 330. The testing system 305 can also include a replay engine 335. Generally speaking, the replay engine 335 can, for example in response to a request from a user of the testing system 305, retrieve the test results 330 and present on a replay user interface 340 provided by the replay engine 335 a reproduction of the tests executed on the user interface 325 of the AUT 320 as recorded in the test results 330.

In some cases, the user interface 325 of the AUT 320 can include one or more infinite scroll elements 345. As known in the art, an infinite scroll element 345, such as used in well-known websites such as YouTube, Facebook, Instagram, Twitter, and others, can present any number of objects 350A-350F such as photographs, videos thumbnails, textual and/or graphical posts, links, etc. Rather than splitting these objects 350A-350F between multiple pages or elements, the objects 350A-350F are presented in a manner such that when a user utilizes a scroll bar 355 of the infinite scroll element 345, presented objects 350A-350F scroll out of view while new, additional objects scroll into view in a continuous and seemingly infinite manner as the user continues to scroll.

Embodiments of the disclosure provide systems and methods for automated testing of the AUT 320 including any infinite scroll element 345 in the user interface 325 of the AUT 320. Accordingly, the test engine 310 can be adapted to, during performance of the one or more functional tests defined in the test scripts 315, detect a scroll event associated with an element, e.g., infinite scroll element 345, of the user interface 325 of the AUT 320. The testing engine 310 can then make a determination can be made as to whether the element associated with the scroll event is an infinite scroll element 345. Additional details of an exemplary process as may be performed by the testing engine 310 of the testing system 305 to determine whether the element associated with the scroll event is an infinite scroll element 345 will be described further below with reference to FIG. 5.

As noted above, the testing engine 310 can record a set of test results 330 for the one or more functional tests. The set of test results can include results for the infinite scroll element 345 and an interaction with the infinite scroll element 345, e.g., a scroll action. Recording the set of test results can include recording a total number of times the infinite scroll element has been scrolled for the infinite scroll element 345, a scroll target for the infinite scroll element 345, an action object for the infinite scroll element 345, and/or a maximum scroll amount for the infinite scroll element 345. Additional details of an exemplary process as may be executed by the testing engine 310 of the testing system 305 to record test results 330 will be described below with reference to FIG. 6.

Also as noted above, the replay engine 335 can replay the infinite scroll element 345 and the interaction with the infinite scroll element 345 as recorded in the test results 330. Replaying the test results 330 for the infinite scroll element 345 and the interaction with the infinite scroll element 345 can comprise rendering by the replay engine 335 on the replay user interface 340 the infinite scroll element 345 and simulating, on the rendered infinite scroll element, the recorded interaction with the infinite scroll element 345. Additional details of an exemplary process as may be executed by the replay engine 335 of the testing system 305 to replay test results 330 will be described below with reference to FIG. 7.

Figure 4:
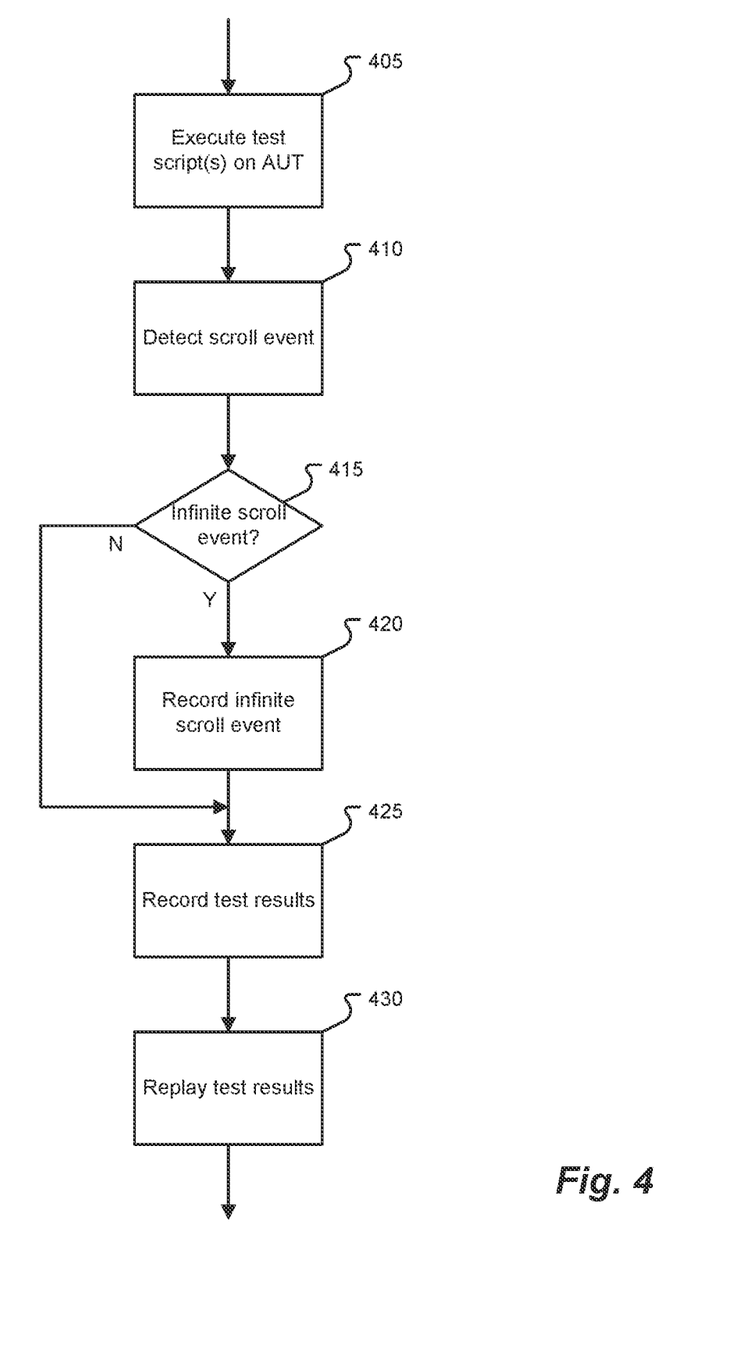
FIG. 4 is a flowchart illustrating an exemplary process for automated testing of an application that utilizes an infinite scroll element according to one embodiment of the present disclosure.

FIG. 4 is a flowchart illustrating an exemplary process for automated testing of an application that utilizes an infinite scroll element according to one embodiment of the present disclosure. As illustrated in this example, automated testing of an application that utilizes an infinite scroll element can comprise executing 405 one or more test scripts on an AUT. As described above, the AUT can present a user interface including a plurality of elements and the one or more test scripts can causing the test system to perform one or more functional tests on the AUT through the plurality of elements of the user interface.

During performance of the one or more functional tests, a scroll event associated with an element of the plurality of elements of the user interface can be detected 410 and a determination 415 can be made as to whether the element associated with the scroll event is an infinite scroll element. Details of an exemplary process for determining 415 whether the element associated with the scroll event is an infinite scroll element will be described below with reference for FIG. 5.

In response to determining 415 the element associated with the scroll event is an infinite scroll element, a set of test results for the one or more functional tests can be recorded 420. Details of an exemplary process for recording 420 test results for the infinite scroll element will be described below with reference to FIG. 6. Generally speaking, the set of test results can include results for the infinite scroll element and an interaction with the infinite scroll element. In some cases, the recorded results for the infinite scroll element and the interaction with the infinite scroll element can include, but are not limited to, a scroll target for the infinite scroll element, an action object for the infinite scroll element, and/or a maximum scroll amount for the infinite scroll element.

In addition to, or instead of, recording 420 test results for the infinite scroll element, test results for other elements of the user interface of the AUT can be recorded 425. At some point in time, for example, on demand by a user of the testing system, the saved results, including the saved results for the infinite scroll element and the interaction with the infinite scroll element, can be replayed 430. Replaying 430 results for elements other than the infinite scroll element, if any, can be performed according to various processes as known in the art. Details of an exemplary process for replaying 430 saved results for the infinite scroll element and the interaction with the infinite scroll element will be described below with reference to FIG. 7.

Figure 5:
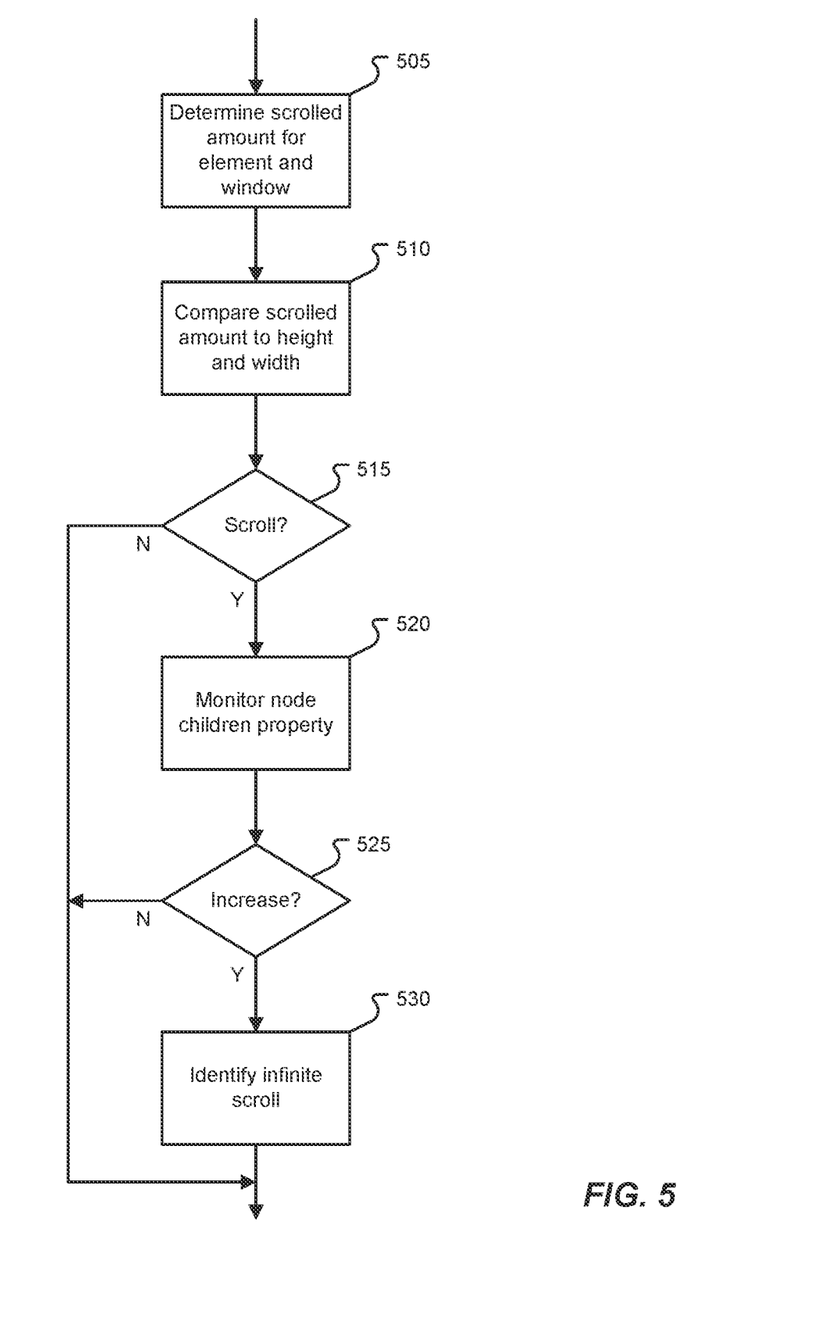
FIG. 5 is a flowchart illustrating an exemplary process for determining whether a scroll event is associated with an infinite scroll element according to one embodiment of the present disclosure.

FIG. 5 is a flowchart illustrating an exemplary process for determining whether a scroll event is associated with an infinite scroll element according to one embodiment of the present disclosure. As illustrated in this example, determining whether the element associated with the scroll event is an infinite scroll element can comprise determining 505 a scrolled amount for the element associated with the scroll event and a window containing the element associated with the scroll event. The determined scrolled amount for the element associated with the scroll event and a window containing the element associated can be compared 510 with the scroll event to a height and width for the element associated with the scroll event and the window containing the element associated with the scroll event. A determination 515 can be made as to whether the element associated with the scroll event is continuing to be scrolled based on comparing the determined scrolled amount for the element associated with the scroll event and the window containing the element associated with the scroll event to the height and width for the element associated with the scroll event and the window containing the element associated with the scroll event.

In response to determining 515 the element corresponding the scroll event is continuing to be scrolled, a node child property of the element associated with the scroll event can be monitored 520 and a determination 525 can be made, based on monitoring 520 the node child property of the element associated with the scroll event, as to whether a number of child nodes of the element associated with the scroll event has increased. In response to determining 525 the number of child nodes of the element associated with the scroll event has increased, the element associated with the scroll event can be identified 530 as an infinite scroll element.

Figure 6:
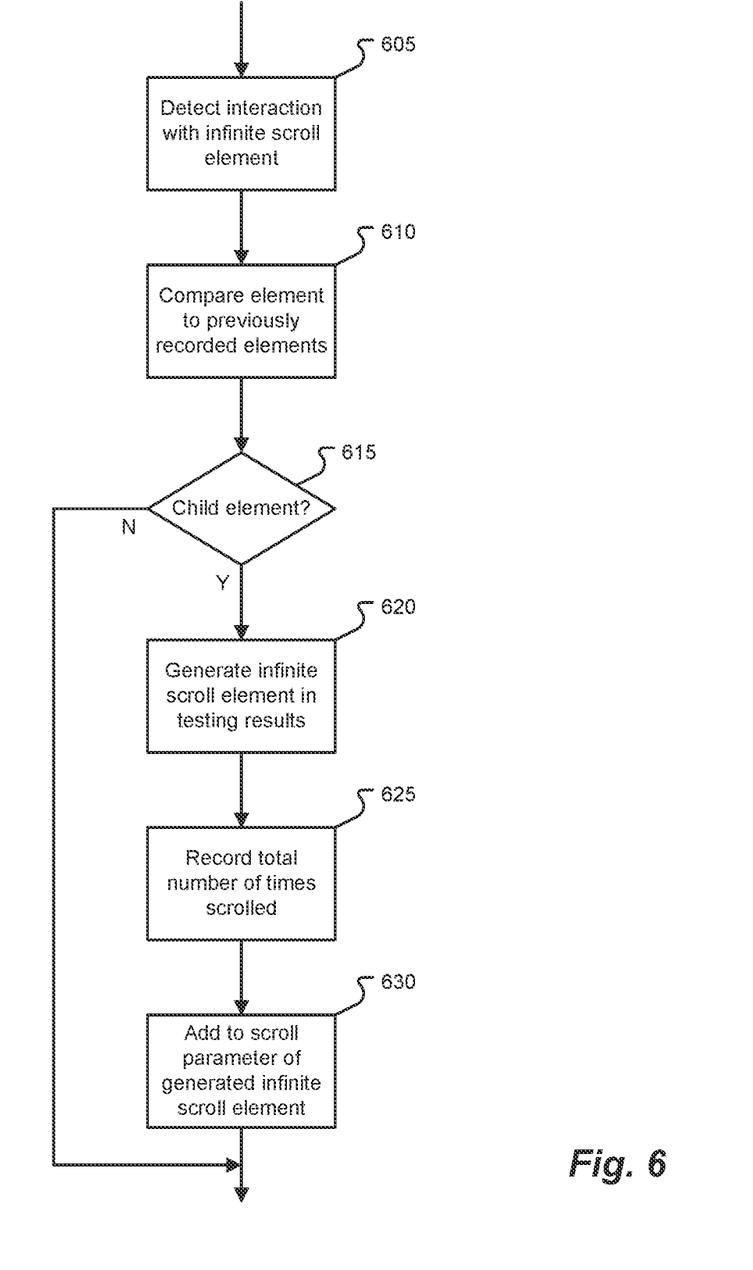
FIG. 6 is a flowchart illustrating an exemplary process for recording test results according to one embodiment of the present disclosure.

FIG. 6 is a flowchart illustrating an exemplary process for recording test results according to one embodiment of the present disclosure. As illustrated in this example, recording the set of test result including results for the infinite scroll element and an interaction with the infinite scroll element can comprise detecting 605 the interaction with the infinite scroll element and comparing 610 the element to one or more previously recorded elements of the user interface of the AUT. A determination 615 can then be made, e.g., based on comparing 610 the element to one or more previously recorded elements of the user interface of the AUT, as to whether the infinite scroll element is a child element of a previously recorded infinite scroll element. In response to determining 615 the infinite scroll element is a child element of a previously recorded infinite scroll element, a corresponding infinite scroll element can be generated 620 in the set of test results, a total number of times the infinite scroll element has been scrolled can be recorded 625 for the corresponding infinite scroll element in the set of test results, and the total number of times the infinite scroll element has been scrolled can be added 630 to a scroll parameter for the corresponding infinite scroll element in the set of testing results.

Figure 7:
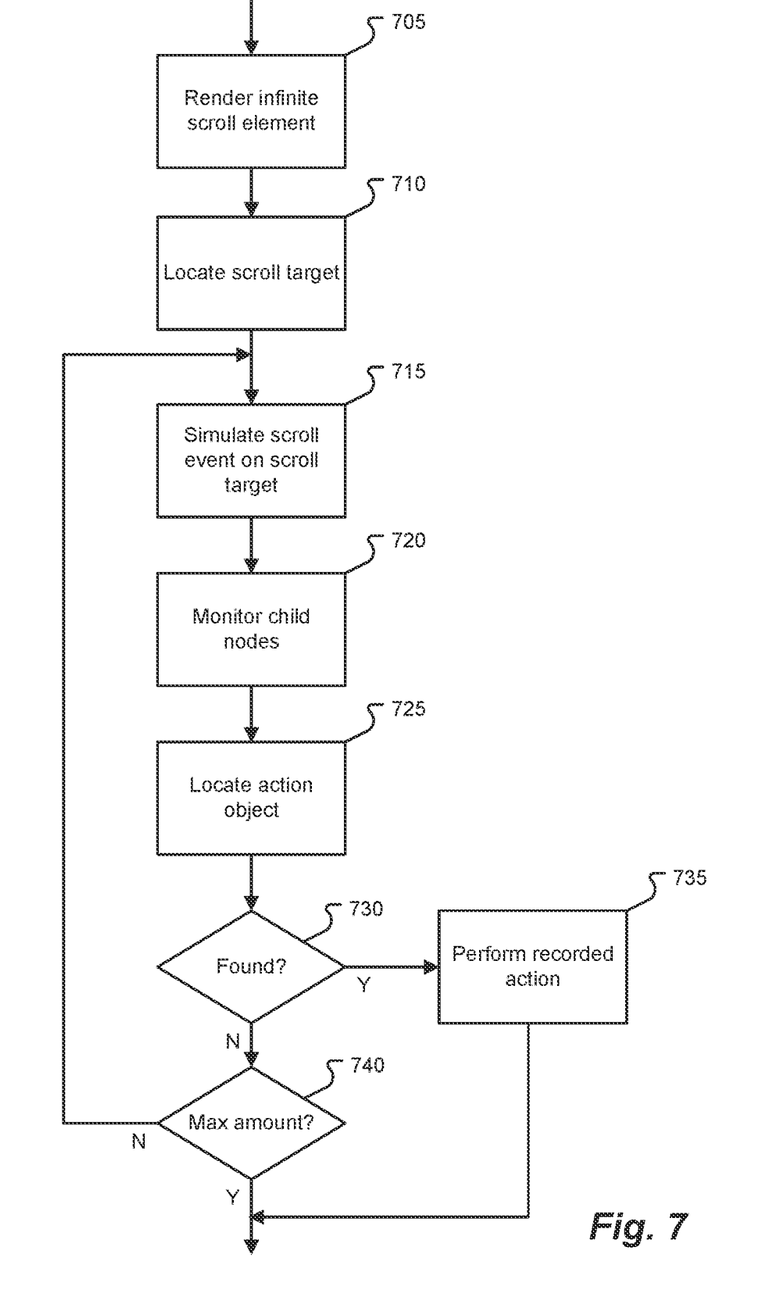
FIG. 7 is a flowchart illustrating an exemplary process for replaying test results according to one embodiment of the present disclosure.

FIG. 7 is a flowchart illustrating an exemplary process for replaying test results according to one embodiment of the present disclosure. As illustrated in this example, replaying the results for the infinite scroll element and the interaction with the infinite scroll element can comprise rendering 705 the infinite scroll element based on the results for the infinite scroll element recorded in the test results and the scroll target for the rendered infinite scroll element can be located 710 based on the interaction with the infinite scroll element recorded in the test results.

The recorded interaction with the infinite scroll element can be simulated 715 on the rendered infinite scroll element based on the located target. While simulating the recorded interaction with the infinite scroll element, monitoring 720 can be performed for one or more child nodes of the infinite scroll element. Additionally, or alternatively, an attempt to locate 725 an action object of the infinite scroll element, if present can be made. A determination 730 can be made, based on monitoring for the one or more child nodes of the infinite scroll element, as to whether the action object for the infinite scroll element has been located.

In response to determining 730 the action object of the infinite scroll element has been located, the recorded action can be performed 735 on the action object. In response to determining 730 the action object of the infinite scroll element has not been located, a further determination 740 can be made, based on simulating the recorded interaction with the infinite scroll element, as to whether the maximum scroll amount for the infinite scroll element has been reached. In response to determining 740 the maximum scroll amount for the infinite scroll element has not been reached, simulating 715 the recorded interaction with the infinite scroll element, monitoring 720 for one or more child nodes of the infinite scroll element, locating 725 the action object, if any, and determining 730 whether the action object of the infinite scroll element is located can be repeated until determining 730 that the action object for the infinite scroll element has been located or determining 740 the maximum scroll amount for the infinite scroll element is reached.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for automated testing of an application that utilizes an infinite scroll element, the method comprising:
   executing, by a processor of a testing system, one or more test scripts on an Application Under Test (AUT), the AUT presenting a user interface including a plurality of elements and the one or more test scripts causing the processor to perform one or more functional tests on the AUT through the plurality of elements of the user interface;
   detecting, by the processor of the testing system, during performance of the one or more functional tests, a scroll event associated with an element of the plurality of elements of the user interface;
   determining, by the processor of the testing system, whether the element associated with the scroll event is an infinite scroll element; and
   in response to determining that the element associated with the scroll event is an infinite scroll element, recording, by the processor of the testing system, a set of test results for the one or more functional tests, the set of test results including results for the infinite scroll element and an interaction with the infinite scroll element.

2. The method of claim 1, wherein determining whether the element associated with the scroll event is an infinite scroll element comprises:
   determining a scrolled amount for the element associated with the scroll event and a window containing the element associated with the scroll event;
   comparing the determined scrolled amount for the element associated with the scroll event and a window containing the element associated with the scroll event to a height and width for the element associated with the scroll event and the window containing the element associated with the scroll event;
   determining, based on comparing the determined scrolled amount for the element associated with the scroll event and the window containing the element associated with the scroll event to the height and width for the element associated with the scroll event and the window containing the element associated with the scroll event, whether the element associated with the scroll event is continuing to be scrolled;
   in response to determining the element corresponding the scroll event is continuing to be scrolled, monitoring a node child property of the element associated with the scroll event and determining, based on monitoring the node child property of the element associated with the scroll event, whether a number of child nodes of the element associated with the scroll event has increased; and
   in response to determining the number of child nodes of the element associated with the scroll event has increased, identifying the element associated with the scroll event as an infinite scroll element.

3. The method of claim 1, wherein recording the set of test results including results for the infinite scroll element and an interaction with the infinite scroll element comprises:
   detecting the interaction with the infinite scroll element;
   determining whether the infinite scroll element is a child element of a previously recorded infinite scroll element; and
   in response to determining the infinite scroll element is a child element of a previously recorded infinite scroll element, generating a corresponding infinite scroll element in the set of test results, recording a total number of times the infinite scroll element has been scrolled for the corresponding infinite scroll element in the set of test results, and adding the total number of times the infinite scroll element has been scrolled to a scroll parameter for the corresponding infinite scroll element in the set of testing results.

4. The method of claim 1, wherein the recorded set of test results including results for the infinite scroll element and the interaction with the infinite scroll element comprise a scroll target for the infinite scroll element, an action object for the infinite scroll element, and a maximum scroll amount for the infinite scroll element.

5. The method of claim 4, further comprising replaying, by the processor of the testing system, the results for the infinite scroll element and an interaction with the infinite scroll element.

6. The method of claim 5, wherein replaying the results for the infinite scroll element and the interaction with the infinite scroll element comprises:
   rendering the infinite scroll element based on the results for the infinite scroll element recorded in the set of test results;
   locating the scroll target for the rendered infinite scroll element based on the interaction with the infinite scroll element recorded in the set of test results;
   simulating, on the rendered infinite scroll element, the interaction recorded in the set of test results with the infinite scroll element based on the located scroll target;
   monitoring, while simulating the interaction recorded in the set of test results with the infinite scroll element, for one or more child nodes of the infinite scroll element;
   determining, based on monitoring for the one or more child nodes of the infinite scroll element, whether the action object for the infinite scroll element has been located; and
   in response to determining the action object of the infinite scroll element has been located, performing a recorded action on the action object.

7. The method of claim 6, further comprising:
   in response to determining the action object of the infinite scroll element has not been located, determining, based on simulating the interaction recorded in the set of test results with the infinite scroll element, whether the maximum scroll amount for the infinite scroll element has been reached; and
   in response to determining the maximum scroll amount for the infinite scroll element has not been reached, continuing to simulate the interaction recorded in the set of test results with the infinite scroll element, monitoring for one or more child nodes of the infinite scroll element, and determining whether the action object of the infinite scroll element is located until determining that the action object for the infinite scroll element has been located or determining the maximum scroll amount for the infinite scroll element is reached.

8. A system comprising:

a processor; and a memory coupled with and readable by the processor and storing therein a set of instructions which, when executed by the processor, causes the processor to perform automated testing on an application that utilizes an infinite scroll element by:

executing one or more test scripts on an Application Under Test (AUT), the AUT presenting a user interface including a plurality of elements and the one or more test scripts causing the processor to perform one or more functional tests on the AUT through the plurality of elements of the user interface;

detecting during performance of the one or more functional tests, a scroll event associated with an element of the plurality of elements of the user interface;

determining whether the element associated with the scroll event is an infinite scroll element; and     in response to determining that the element associated with the scroll event is an infinite scroll element, recording a set of test results for the one or more functional tests, the set of test results including results for the infinite scroll element and an interaction with the infinite scroll element.

9. The system of claim 8, wherein determining whether the element associated with the scroll event is an infinite scroll element comprises:

determining a scrolled amount for the element associated with the scroll event and a window containing the element associated with the scroll event;

comparing the determined scrolled amount for the element associated with the scroll event and a window containing the element associated with the scroll event to a height and width for the element associated with the scroll event and the window containing the element associated with the scroll event;

determining, based on comparing the determined scrolled amount for the element associated with the scroll event and the window containing the element associated with the scroll event to the height and width for the element associated with the scroll event and the window containing the element associated with the scroll event, whether the element associated with the scroll event is continuing to be scrolled;

in response to determining the element corresponding the scroll event is continuing to be scrolled, monitoring a node child property of the element associated with the scroll event and determining, based on monitoring the node child property of the element associated with the scroll event, whether a number of child nodes of the element associated with the scroll event has increased; and     in response to determining the number of child nodes of the element associated with the scroll event has increased, identifying the element associated with the scroll event as an infinite scroll element.

10. The system of claim 8, wherein recording the set of test result including results for the infinite scroll element and an interaction with the infinite scroll element comprises:

detecting the interaction with the infinite scroll element;

determining whether the infinite scroll element is a child element of a previously recorded infinite scroll element; and     in response to determining the infinite scroll element is a child element of a previously recorded infinite scroll element, generating a corresponding infinite scroll element in the set of test results, recording a total number of times the infinite scroll element has been scrolled for the corresponding infinite scroll element in the set of test results, and adding the total number of times the infinite scroll element has been scrolled to a scroll parameter for the corresponding infinite scroll element in the set of testing results.

11. The system of claim 8, wherein the recorded set of test results including results for the infinite scroll element and the interaction with the infinite scroll element comprise a scroll target for the infinite scroll element, an action object for the infinite scroll element, and a maximum scroll amount for the infinite scroll element.

12. The system of claim 11, wherein the instructions further cause the processor to replay the results for the infinite scroll element and an interaction with the infinite scroll element.

13. The system of claim 12, wherein replaying the results for the infinite scroll element and the interaction with the infinite scroll element comprises:

rendering the infinite scroll element based on the results for the infinite scroll element recorded in the set of test results;

locating the scroll target for the rendered infinite scroll element based on the interaction with the infinite scroll element recorded in the set of test results;

simulating, on the rendered infinite scroll element, the interaction recorded in the set of test results with the infinite scroll element based on the located scroll target;

monitoring, while simulating the interaction recorded in the set of test results with the infinite scroll element, for one or more child nodes of the infinite scroll element;

determining, based on monitoring for the one or more child nodes of the infinite scroll element, whether the action object for the infinite scroll element has been located; and     in response to determining the action object of the infinite scroll element has been located, performing a recorded action on the action object.

14. The system of claim 13, wherein replaying the results for the infinite scroll element and the interaction with the infinite scroll element further comprises:

in response to determining the action object of the infinite scroll element has not been located, determining, based on simulating the interaction recorded in the set of test results with the infinite scroll element, whether the maximum scroll amount for the infinite scroll element has been reached; and     in response to determining the maximum scroll amount for the infinite scroll element has not been reached, continuing to simulate the interaction recorded in the set of test results with the infinite scroll element, monitoring for one or more child nodes of the infinite scroll element, and determining whether the action object of the infinite scroll element is located until determining that the action object for the infinite scroll element has been located or determining the maximum scroll amount for the infinite scroll element is reached.

15. A non-transitory, computer-readable medium comprising a set of instructions stored therein which, when executed by a processor, causes the processor to perform automated testing on an application that utilizes an infinite scroll element by:

executing one or more test scripts on an Application Under Test (AUT), the AUT presenting a user interface including a plurality of elements and the one or more test scripts causing the processor to perform one or more functional tests on the AUT through the plurality of elements of the user interface;

detecting during performance of the one or more functional tests, a scroll event associated with an element of the plurality of elements of the user interface;

determining whether the element associated with the scroll event is an infinite scroll element; and     in response to determining that the element associated with the scroll event is an infinite scroll element, recording a set of test results for the one or more functional tests, the set of test results including results for the infinite scroll element and an interaction with the infinite scroll element.

16. The non-transitory, computer-readable medium of claim 15, wherein determining whether the element associated with the scroll event is an infinite scroll element comprises:

determining a scrolled amount for the element associated with the scroll event and a window containing the element associated with the scroll event;

comparing the determined scrolled amount for the element associated with the scroll event and a window containing the element associated with the scroll event to a height and width for the element associated with the scroll event and the window containing the element associated with the scroll event;

determining, based on comparing the determined scrolled amount for the element associated with the scroll event and the window containing the element associated with the scroll event to the height and width for the element associated with the scroll event and the window containing the element associated with the scroll event, whether the element associated with the scroll event is continuing to be scrolled;

in response to determining the element corresponding the scroll event is continuing to be scrolled, monitoring a node child property of the element associated with the scroll event and determining, based on monitoring the node child property of the element associated with the scroll event, whether a number of child nodes of the element associated with the scroll event has increased; and     in response to determining the number of child nodes of the element associated with the scroll event has increased, identifying the element associated with the scroll event as an infinite scroll element.

17. The non-transitory, computer-readable medium of claim 15, wherein recording the set of test result including results for the infinite scroll element and an interaction with the infinite scroll element comprises:

detecting the interaction with the infinite scroll element;

determining whether the infinite scroll element is a child element of a previously recorded infinite scroll element; and     in response to determining the infinite scroll element is a child element of a previously recorded infinite scroll element, generating a corresponding infinite scroll element in the set of test results, recording a total number of times the infinite scroll element has been scrolled for the corresponding infinite scroll element in the set of test results, and adding the total number of times the infinite scroll element has been scrolled to a scroll parameter for the corresponding infinite scroll element in the set of testing results.

18. The non-transitory, computer-readable medium of claim 15, wherein the recorded set of test results including results for the infinite scroll element and the interaction with the infinite scroll element comprise a scroll target for the infinite scroll element, an action object for the infinite scroll element, and a maximum scroll amount for the infinite scroll element.

19. The non-transitory, computer-readable medium of claim 18, wherein the instructions further cause the processor to replay the results for the infinite scroll element and an interaction with the infinite scroll element and wherein replaying the results for the infinite scroll element and the interaction with the infinite scroll element comprises:

rendering the infinite scroll element based on the results for the infinite scroll element recorded in the set of test results;

locating the scroll target for the rendered infinite scroll element based on the interaction with the infinite scroll element recorded in the set of test results;

simulating, on the rendered infinite scroll element, the interaction recorded in the set of test results with the infinite scroll element based on the located scroll target;

monitoring, while simulating the interaction recorded in the set of test results with the infinite scroll element, for one or more child nodes of the infinite scroll element;

determining, based on monitoring for the one or more child nodes of the infinite scroll element, whether the action object for the infinite scroll element has been located; and     in response to determining the action object of the infinite scroll element has been located, performing a recorded action on the action object.

20. The non-transitory, computer-readable medium of claim 19, wherein replaying the results for the infinite scroll element and the interaction with the infinite scroll element further comprises:

in response to determining the action object of the infinite scroll element has not been located, determining, based on simulating the interaction recorded in the set of test results with the infinite scroll element, whether the maximum scroll amount for the infinite scroll element has been reached; and     in response to determining the maximum scroll amount for the infinite scroll element has not been reached, continuing to simulate the interaction recorded in the set of test results with the infinite scroll element, monitoring for one or more child nodes of the infinite scroll element, and determining whether the action object of the infinite scroll element is located until determining that the action object for the infinite scroll element has been located or determining the maximum scroll amount for the infinite scroll element is reached.

\* \* \* \* \*